A. MICHOUD.
TARGET APPARATUS.
APPLICATION FILED JUNE 10, 1919.

1,406,674.

Patented Feb. 14, 1922.
9 SHEETS—SHEET 1.

Inventor
Arnold Michoud
By Serrell Son
his attorney

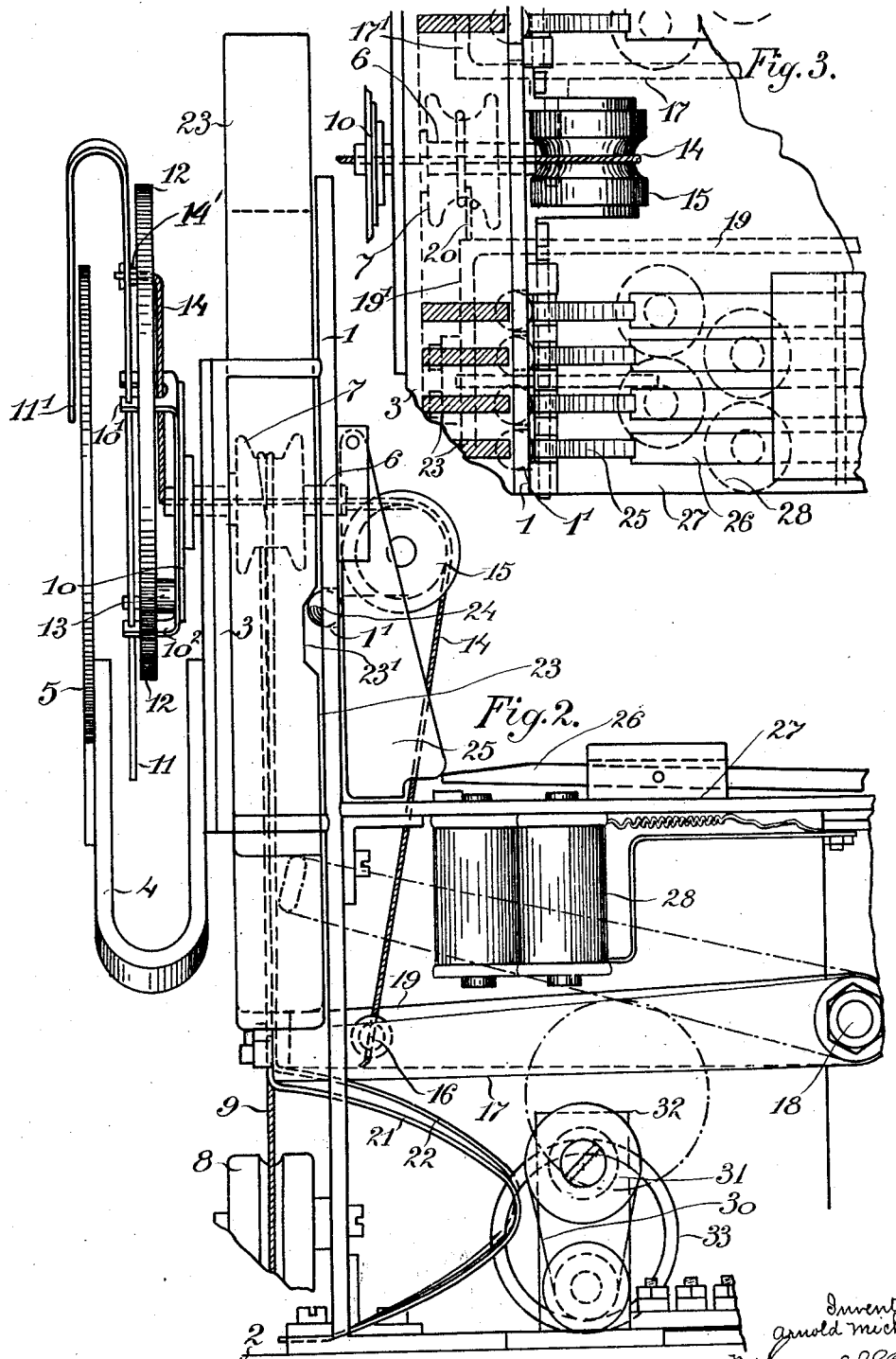

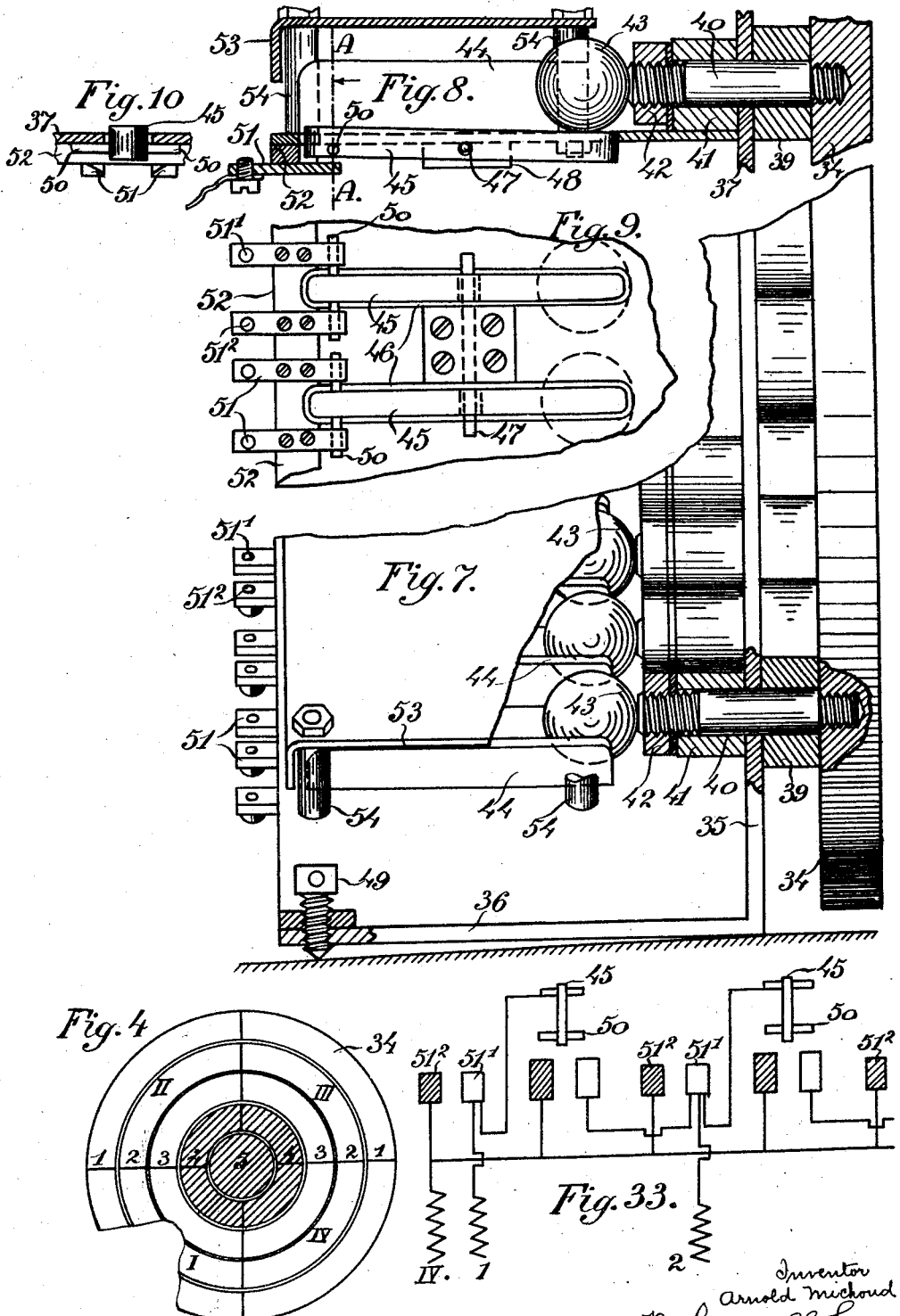

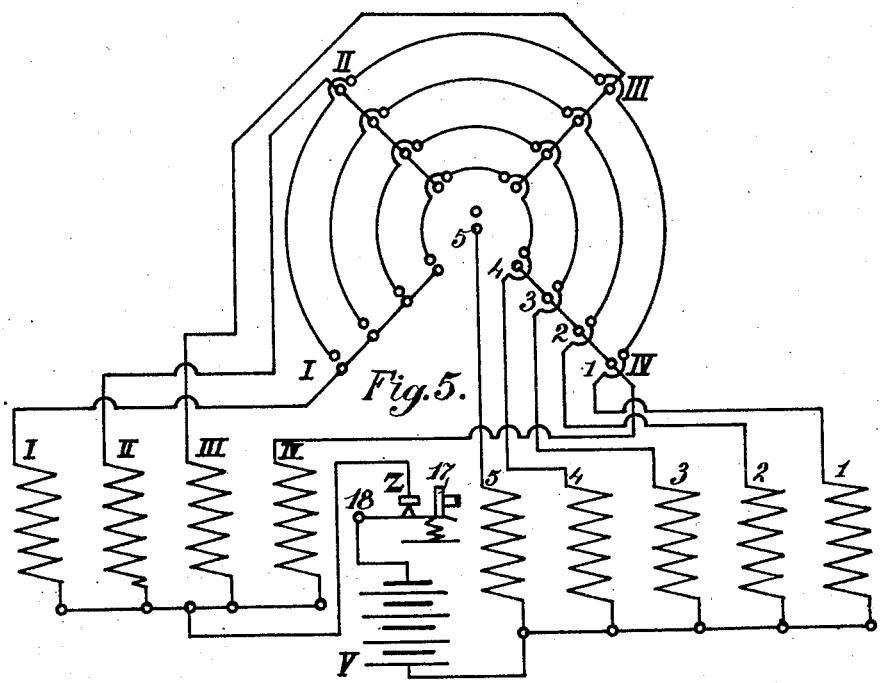

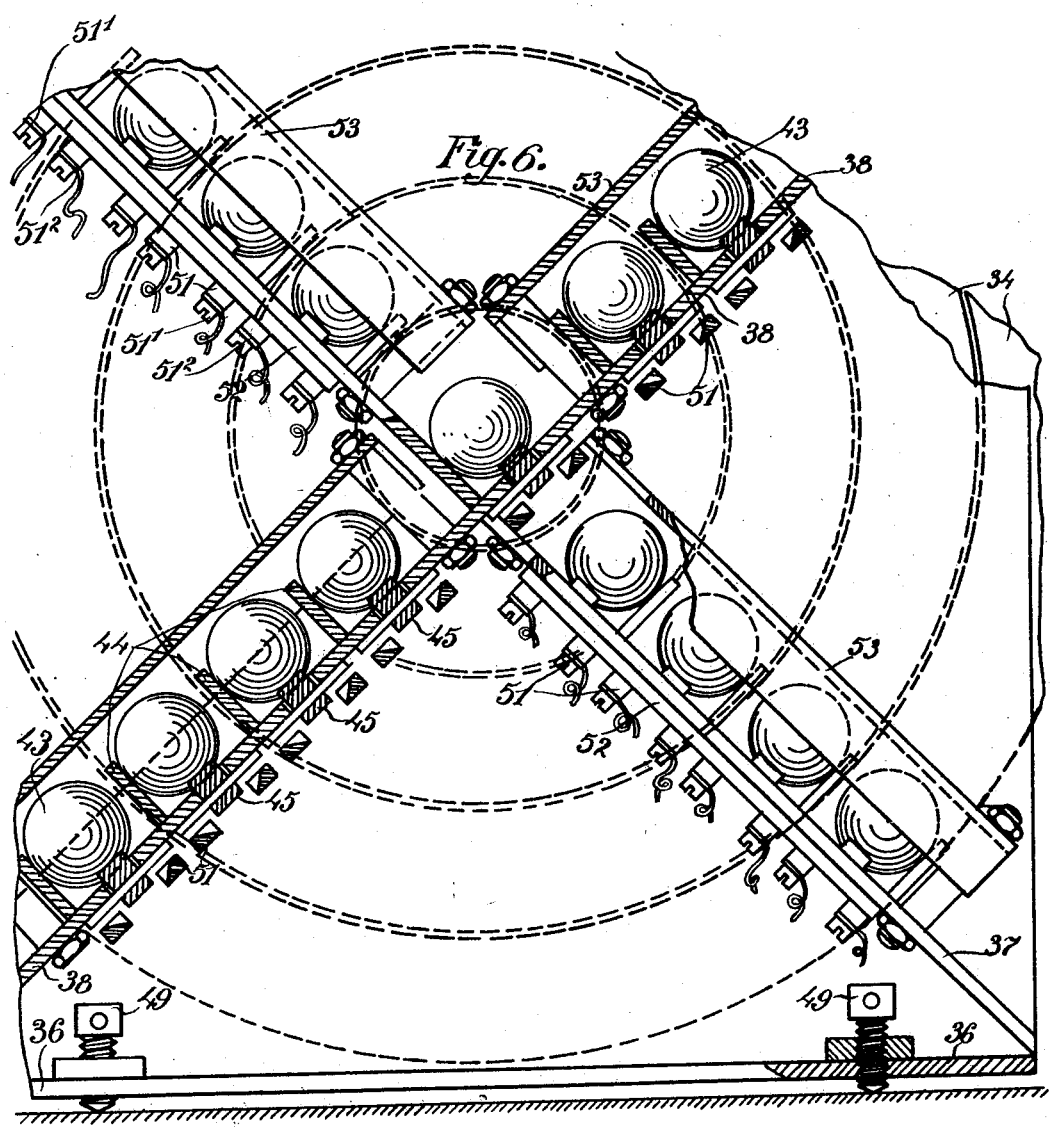

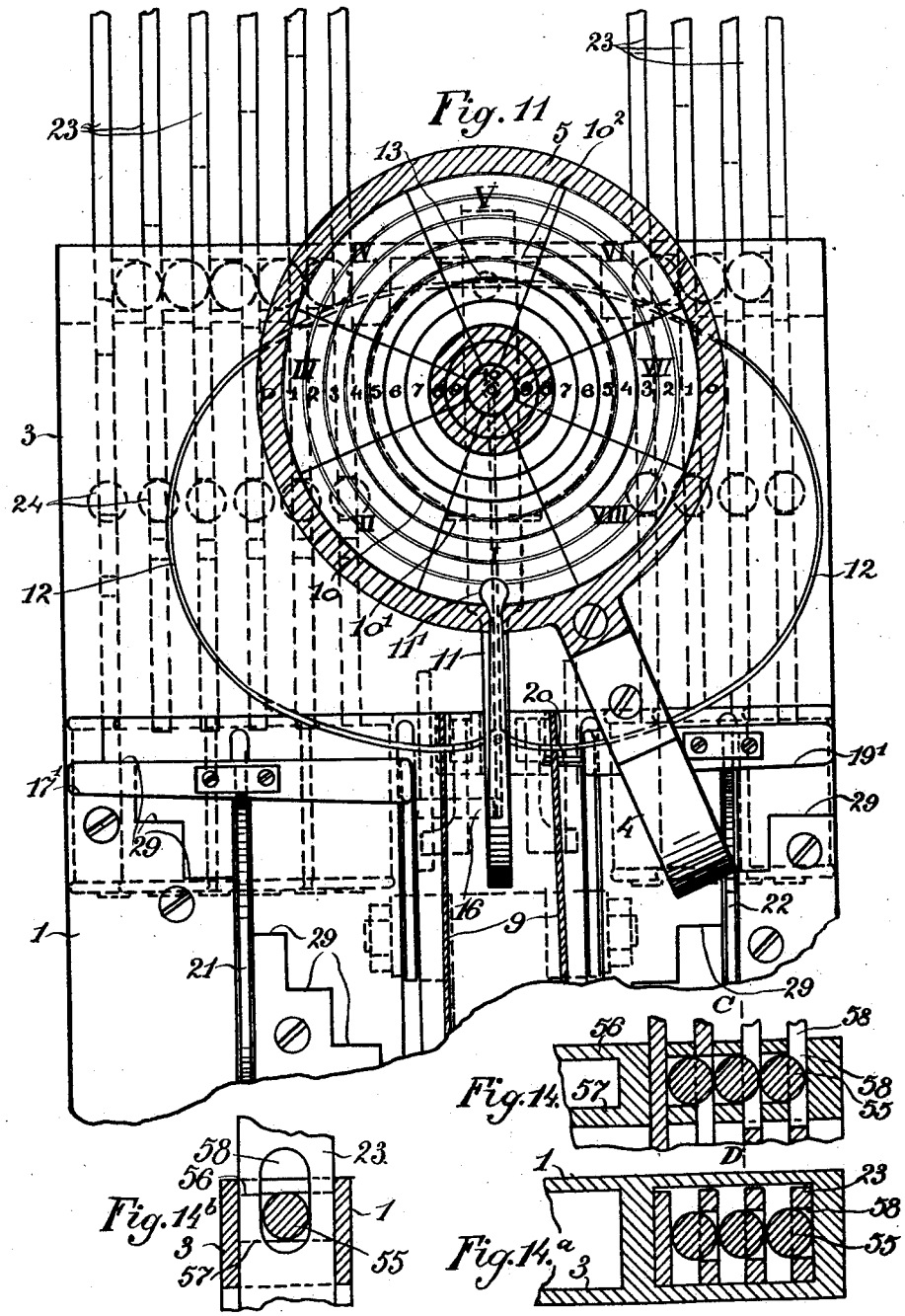

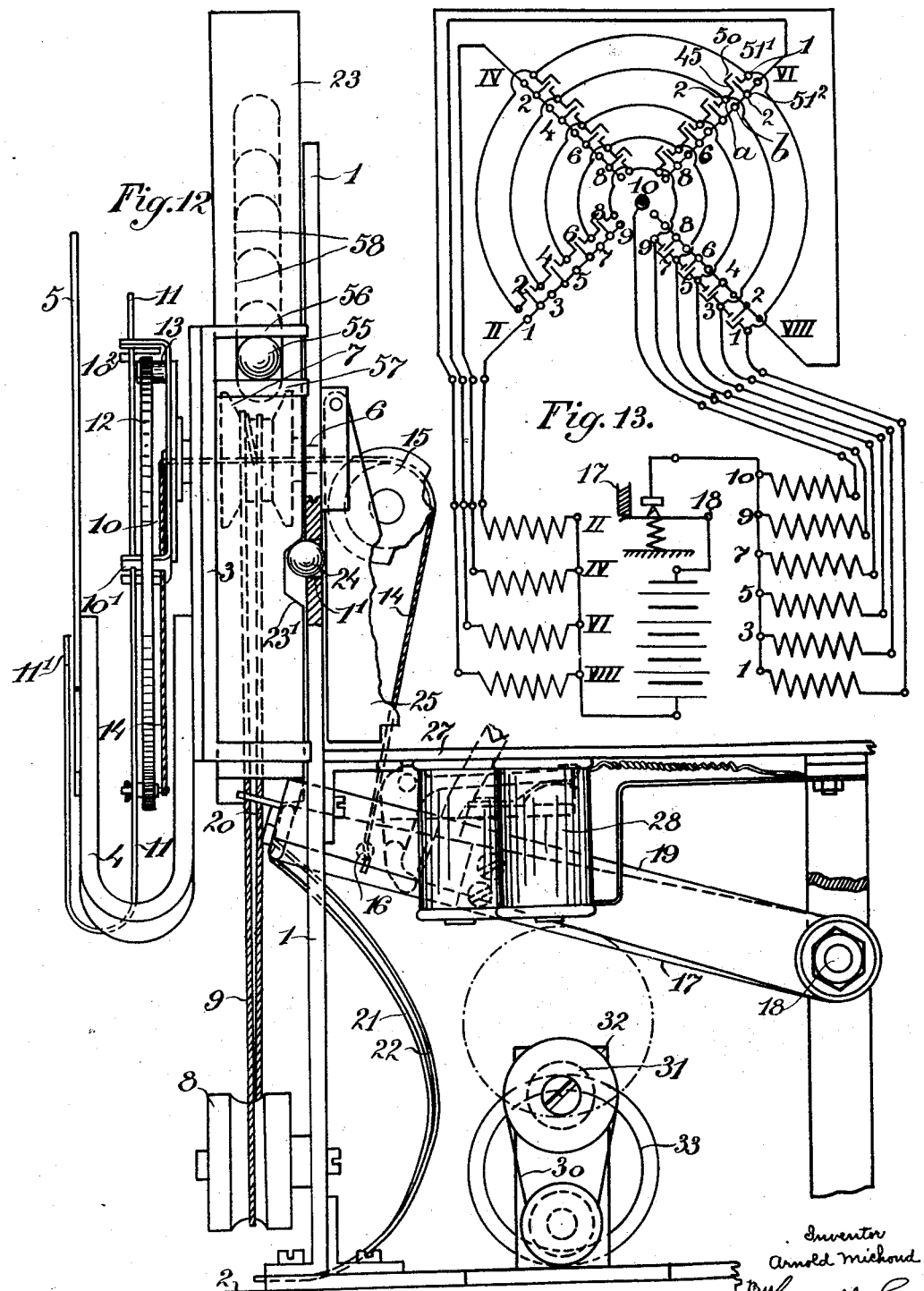

A. MICHOUD.
TARGET APPARATUS.
APPLICATION FILED JUNE 10, 1919.
1,406,674. Patented Feb. 14, 1922.
9 SHEETS—SHEET 8.
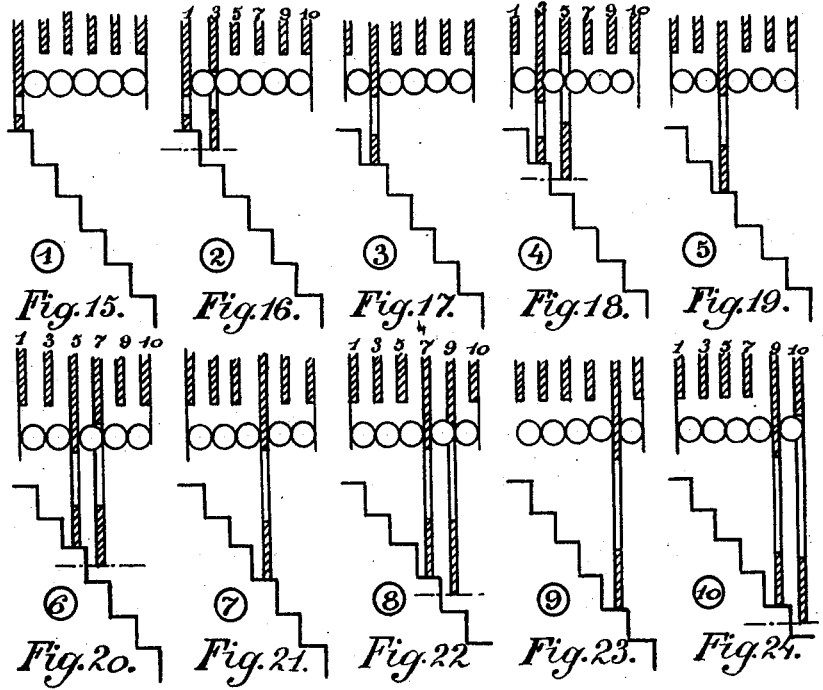
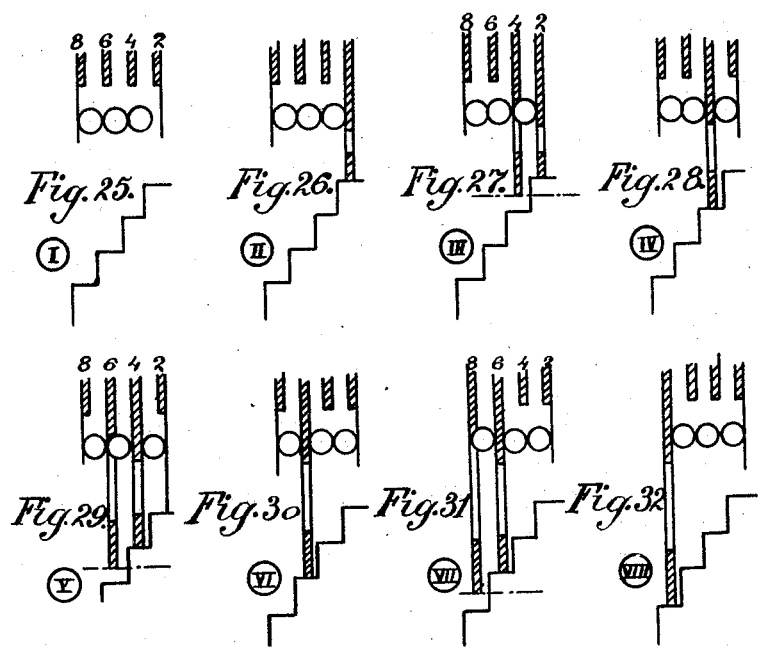
Inventor
Arnold Michoud

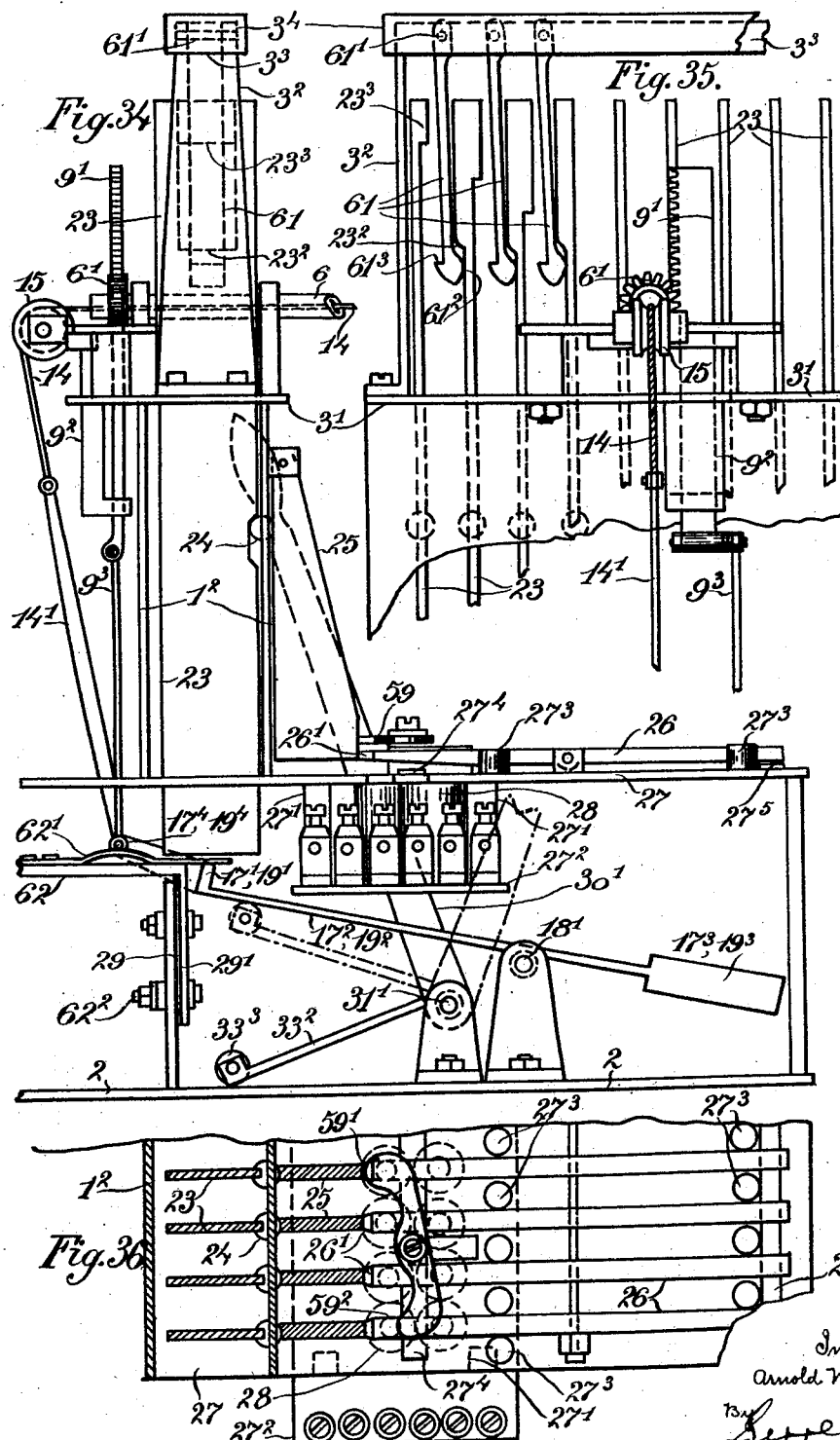

UNITED STATES PATENT OFFICE.

ARNOLD MICHOUD, OF YVERDON, SWITZERLAND, ASSIGNOR TO FIRM: SOCIÉTÉ CIBLES AUTOMATIQUES MICHOUD S. A., OF NEUCHATEL, SWITZERLAND.

TARGET APPARATUS.

1,406,674.      Specification of Letters Patent.      Patented Feb. 14, 1922.

Application filed June 10, 1919. Serial No. 303,225.

*To all whom it may concern:*

Be it known that I, ARNOLD MICHOUD, electrician, a citizen of Switzerland, residing at Yverdon, Canton of Vaud, in the Confederation of Switzerland, have invented certain new and useful Improvements in Target Apparatus, of which the following is a specification.

The object of the present invention is the provision of a target apparatus in which there is employed an automatically operated indicator showing to the marksman on a small target, preferably a small facsimile of the target at the butts and located in proximity to him, the location of the hits on the distant target, which is fitted with electrical contacts connected to electro-magnets in the indicator; the indicator being constructed to include a marking member movable on the face of the facsimile target by means of a mechanism under the control of a plurality of connections in an electrical circuit.

According to the type of the target as for instance a dummy target with horizontal zones, or as a bull's eye target, the marking member moving in front of the facsimile target will be controlled by a mechanism marking on the target either the abscissas and ordinates of the spot hit on the target at the butts, or by a mechanism marking the sector of the concentrical circles of the target and the radial distance from the center.

In the first case the pointer may be operated by two arms movable one with a horizontal and the other with a vertical movement and each moved by a range of hammer bars actuated by the closing of a circuit through an electro-magnet.

In the second case the marking member may be mounted on a rotary device operated by means of an endless rope in combination with an arm, the throw of which is variable and is controlled sometimes by the one and sometimes by another of the electro-magnets of the indicator, each magnet determining a certain sector of the facsimile target, or the member may be attached to a rope running through a hollow shaft of the rotary device and attached to an arm, the variable throw of which is controlled either by one or another of the electro-magnets, each magnet determining a certain radial distance.

The working throw of the arms may be determined by falling hammer bars, the movements of which are limited by stops and which are kept in their raised position by means of balls engaged within notches of the bars and retained therein by means of the armatures of the electro-magnets.

The annexed drawings illustrate examples of three working forms of this automatic indicator intended to show the hits on a bull's eye target with four sectors and five concentric circles.

Fig. 2 is a side elevation of the same.

Fig. 3 is a partial sectional plan thereof.

Fig. 4 is a front view on a smaller scale of a target provided with electrical contacts which may be combined with the indicator as represented in Figs. 1 to 3.

Fig. 5 shows a diagram of the electrical connections of such a combination.

Fig. 6 is a rear sectional elevation of the target in Fig. 4, on a larger scale.

Fig. 7 is a sectional elevation viewed from right to left of Fig. 6 with certain parts omitted.

Fig. 8 is a sectional elevation.

Fig. 9 is a plan of a pair of contact levers with the balls associated therewith.

Fig. 10 is a section on line A—A, Fig. 8 viewed from left to right.

Fig. 11 is a front sectional elevation.

Fig. 12 is a side sectional elevation of another form of the indicator.

Fig. 13 is a diagram of the electrical connections of this form of a target with eight sectors and ten circles.

Fig. 14 is a front sectional view of the set of balls for checking the hammer bars which fall under the combined effect of two electro-magnets.

Figure 1:
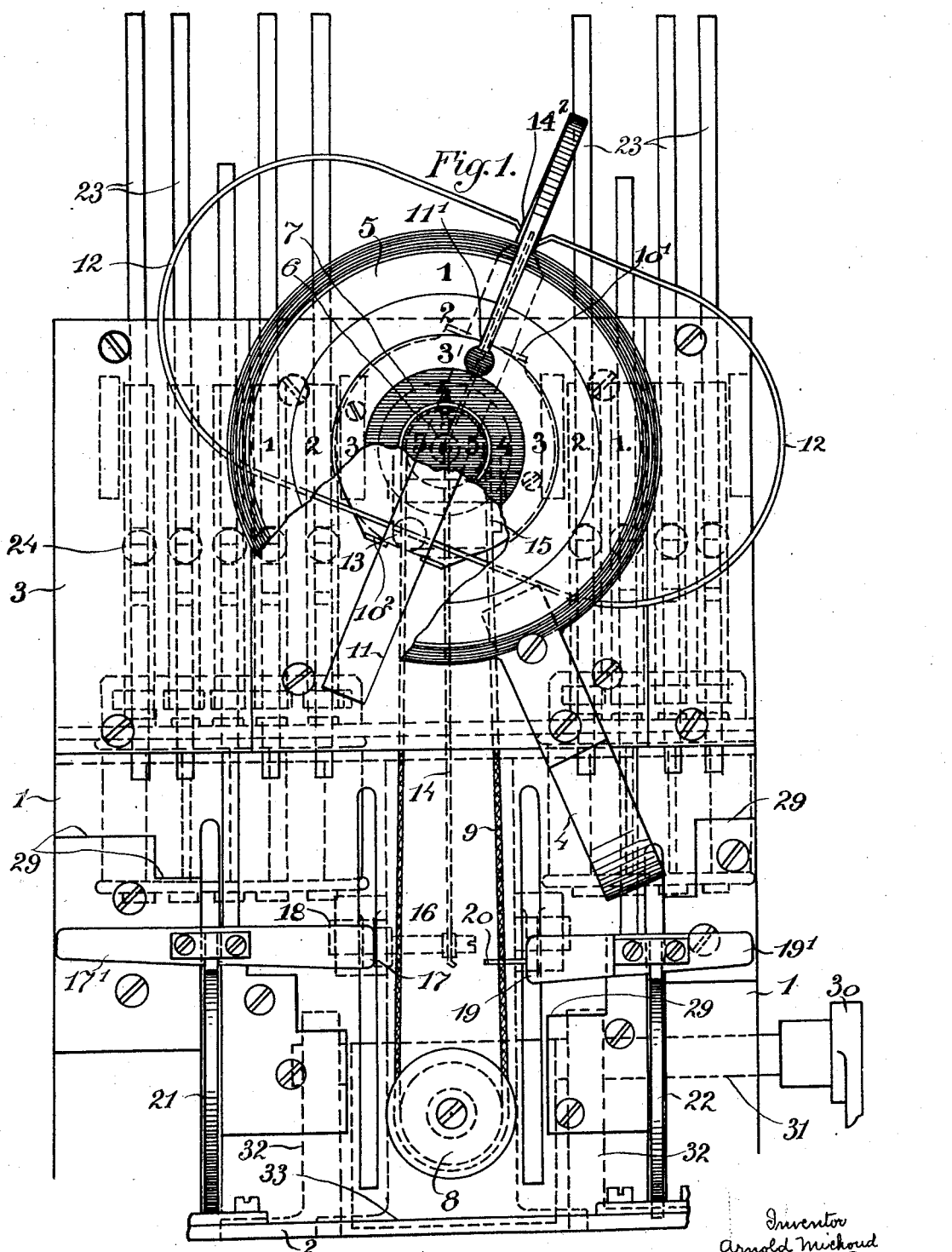
Fig. 1 is a front view of one form of the indicator with part of the facsimile target broken away.

Fig. 14$^a$ is a horizontal section of this set of balls.

Fig. 14$^b$ is a vertical section on line C—D in Fig. 14.

The Figures 15 to 33 are diagrammatical representations explaining the working of the second working form of the indicator.

Fig. 34 is a side elevation of a third form of indicator.

Fig. 35 is a part of a rear elevation of the same, and

Fig. 36 is a partial sectional plan of the same.

In the form of the invention shown in Figs. 1 to 3, a vertical plate 1 mounted on a base plate 2 carries a frame 3 on the outside face of which is fixed by means of a bent arm 4 a facsimile target 5 which is a small reproduction of the target at which the shots are fired. On the front side of the plate 1 and concentrically with said target there is an upper pulley 7 carrying with a lower pulley 8 an endless chain 9. The pulley 7 is fast on a hollow shaft 6. At the end of the shaft 6 and at one side of the target a disk 10 is mounted. This disk 10 is provided with two forks 10', $10^2$ between which a bar 11 is slidably mounted. On the disk 10 there is a stay bolt 13 in which there is secured a spring 12 normally of a substantially circular configuration. The bar 11 has an elongated part bent over in front of the target to form a marking member or pointer 11', the movements of which are controlled in a radial direction by a chain 14, running through the hollow shaft 6, over a pulley 15, and attached to a stay bolt 16 screwed fast into the arm 17 pivoted on an axis 18. A pin 14' is secured in a suitable position to the bar 11 and may have one end of the chain 14 secured thereto. In a position diametrically opposite that in which it is secured in the stay bolt 13 the spring 12 is provided with an indentation $14^2$ adapted to receive the pin 14' so that the spring normally maintains the bar 11 in a position in which the pointer 11' does not extend over the face of the indicating target. This axis carries another arm 19 on the free end of which there is provided a pin 20 to which the endless chain 9 is attached. These arms 17 and 19 are therefore adapted to operate the said bar 11; the arm 17 when oscillating, producing radial movements of the pointer for marking radial distances of the hits from the center, and the arm 19 causing circular movements of the pointer for marking the sectors of the target containing the hits.

I employ two arc shaped springs 21, 22. Corresponding ends of these springs are fastened by means of straps to the arms 17—19 and the other ends are similarly fastened to the base plate 2. The springs 21, 22 tend to raise the arms 17, 19 so as to cause the same to bear against the bottoms of the hammer bars 23 by means of parts 17', 19' bent off at right angles from said arms. The hammer bars are lodged slidably within the frame 3 and are arranged in two groups, one of four bars corresponding to the four sectors of the target, and the other group formed of five bars corresponding to the five concentrical circles of the target. The bars 23 are normally maintained in their raised positions by means of balls 24 lodged like wedges within suitable notches 23' in the edges of the bars and said balls are normally kept in position within recesses 1' of the plate 1 by means of suspended pendulum plates 25 against which pawls 26 pivoted on the frame plate 27 contact. These pawls are the armatures of electromagnets 28 which are employed in equal number with the bars 23 and are secured beneath the plate 27. These electromagnets are electrically connected to the contacts of the target at the butts. As soon as an electrical current energizes one of the electromagnets, this magnet will attract the corresponding pawl and will free its pendulum plate so that owing to the weight of the hammer-bar acting against the curved surface of the ball 24, this ball will be pushed aside leaving the bar free to fall, taking the arm 17 or 19 of the corresponding group along with it. Stop pieces 29 secured to the plate 1 determine the limit of the movement of the falling bars and limit the stroke of the arms producing a correspondingly limited stroke of the bar 11 and of the marking pointer 11'. This stroke of the pointer is either radial or circular according to the group of electromagnets and as always two contacts will be made, one for the sector and one for the concentric circle, so always two simultaneous movements of the pointer will be produced, the one radial and the other circular. In Fig. 1 an instance is represented where the contacts of the third sector in the third circle of the target has been made, and the indicator or facsimile target in proximity of the marksman has indicated the corresponding sector and circle. In the instance under consideration the two arms 17, 19 have been swung under the effect of the fallen bars to a low end position, which of course will be the case at every fall of a bar, and it then becomes necessary in order to reset the indicator for the next shot to return the arms and bars to their initial positions. This is effected by means of a crank 30 operating a shaft 31 supported by the pedestals 32 on the base plate 2. A cylinder 33 is fixed eccentrically on said shaft in such a position underneath the arms 17, 19 that when turning the crank both arms will be raised to their upper position thus also raising the hammer bars. As the electromagnets are then no longer energized the pawls 26 will assume their normal positions locking the pendulum plates 25 as soon as the latter have returned the balls 24 into their notches 23' in the bars, when these bars will again be maintained in their raised positions.

The electromagnets of the indicator may be connected to a target such as is represented in Figs. 6 to 10.

In hitting this target the impact of the bullet causes the closing of electrical circuits by means of a lever operated by balls displaced thereon.

It has been established by testing that this system presents notable advantages with regard to those, where the impact of the projectile acts directly on the circuit closing device. This advantage is due to the retardation of the back movement of the ball after having occasioned the closing of the circuit.

In Figs. 6 to 10, the target 34 comprises five elements to wit a circular central plate 5 surrounded by four concentric circles 4, 3, 2, 1, all separated from each other by a small space and kept at a certain distance from a sheet iron frame consisting of a front plate 35, a base plate 36 and two diagonally crossed plates 37, 38, all connected so as to form a unit body. The distance between the target and the frame is obtained by means of washers 39 made of yielding material placed upon stay bolts 40 fixed at one end to the target, traversing the front plate 35, and provided at the other end with yielding washers 41 held between nuts 42 and the front plate. Facing the free butt end of each stay bolt and normally touching it there is a ball 43 supported in a trough, one part of which is formed by a cross plate and the other part by an auxiliary plate 44 riveted to the said cross plate. At the side of the cross plate each ball rests upon the end of one arm of a balance lever 45 mounted in a recess 46 in the plate. The lever 45 pivoted on an axis 47 secured by a strap 48 with the axis projecting on both sides of said strap thus forming the pivots of two adjacent levers (Fig. 9). In order to insure a close contact between each stay bolt and its ball the trough is slightly inclined towards the bolt, this inclination being obtained by inclining the whole frame by means of adjusting screws 49 screwed into the base plate 36, and by employing the edge of the frame formed by the front and base plates as a supporting edge. The end of the other arm of the said balance lever 45 is crossed by a pin 50 projecting on both sides of the lever so as to rest on the bottom surface of the cross plates (37, 38) counter-balancing the weight of the ball resting on the opposite end of the lever. Underneath said cross plate and at a certain distance from the same metallic strips 51 are held in position being screwed on a bar 52 of insulating material running along the entire edge of the cross plate and supporting all the strips 51 of a complete sector of the target. These strips 51 are supported within reach of the two projecting ends of the pins 50 and thus limit the stroke of the balance lever and carry at their other ends projecting over the edge of the cross plate binding posts or terminals 51', 51² two for each lever, and for two different circuits, the one operating the electro-magnets marking the radial distances and the other operating the electro-magnets marking the sectors of the indicator or facsimile target. When a ball 43 is moved by the effect of a hit on the target and when said ball travels over the rear end of its balance lever 45, this end will swing down and cause a contact between the ends of the pin 50 and the corresponding strips 51. But to insure this double and simultaneous contact, the lever is adapted to turn on the axis 47 with sufficient friction to accomplish this purpose and besides the strips 51 are provided with a sloping edge so as to make the contact only at an edge. Besides it is possible to regulate the time of contact between pin and strips, which time is dependent on the time taken by the ball for traveling backwards and forwardly again by regulating the inclination given to the trough. Above these troughs sheet iron plates 53 with bent down edges are fixed by means of studs 54 to the cross plates 37, 38 in order to limit the recoil of the balls and to retain the same within the troughs. It may be mentioned as an advantage of this manner of arranging the parts that there are no springs employed therein.

According to the diagram shown in Fig. 5 relating to the target as represented in Fig. 4 a battery or other source of electric current V feeds a conductor connecting the four electro-magnets I, II, III, IV, causing the circular movements of the sector indicator, and on the other side a conductor connecting the five electro-magnets 1, 2, 3, 4, 5, causing the radial movements of the pointer. The other terminals of these electro-magnets in the first group are connected with four radial conductors connecting one of the two contacts provided for each circle in each sector of the target and in the second group with the contact of the bull's eye and with four circular conductors connecting the four other contacts of each ring. A circuit closer Z is inserted in the circuit between the source of current and one of the two groups of electro-magnetic and will interrupt the circuit as soon as the lever 17 of the indicator drops under the effect of the current produced by the first contact making ball. If therefore a bullet hits the target for instance on segment 4 of the sector II between a line under 45° and the limit of sector III the ball 4 of the sector II will receive a heavier impact than the ball on the line of 45° within sector III and said ball will therefore be driven back the first and at a greater rate, it will therefore make contact and will cause the pointer to mark a hit within sector II and segment 4, whereupon the circuit will be cut off by the circuit closer Z before any other ball will have made contact. The same thing will happen if a bullet should strike the target on the segment 4 of the sector III, the ball of segment 4 and of sector III would first make contact causing the pointer to mark the hit within segment 4 of the sector III.

The operation of the apparatus is largely dependent on the adjustment of the inclination given to the troughs 44, 45 by means of the screws 49; but it depends also on the operation at the right moment of the circuit closer, see Fig. 5, inasmuch as it takes a certain time for operating the indicator after the contacts 50, 51 51' have been made and also the circuit closer Z has to act quickly enough to prevent other balls from making contact before or simultaneously with the desired ball. Therefore in order to facilitate the adjustment in every respect the contact strip provided on a segment piece fixed to the lever 17 and slidingly on a fixed contact is made adjustable so that the interruption may be made simultaneously with the first movement of lever 17.

In the second form of the invention shown in Figs. 11 to 14$^b$, the target at the butts is divided into eight sectors and ten concentrical segments, and the facsimile target in proximity to the marksman is divided in the same manner. The general arrangement is the same as in the first form of the invention described in connection with Figs. 1 to 10. There are also two groups of hammer bars 23 guided within a frame 3 attached to a plate 1 on a base plate 2, and these are kept in raised position by means of balls 24 which bearing against suspended pendulum plates 25 are normally maintained within recesses 1' of plate 1 and are engaged within notches 23' of the hammer bars. There are likewise arms 17, 19 pressed against the bottom ends of the hammer bars by means of springs 21, 22 and two groups of electromagnets 28 corresponding to the number of the hammer bars. There are also two pulleys 7, 8 and an endless chain 9 attached to a pin 20 fixed on the arm 19 for effecting the circular movements of the pointer, the pulley 7 being fast on a hollow shaft 6 carrying the disk 10 provided with the forks 10', 10$^2$ for guiding the bar ending in a bent up blade forming the pointer 11'. The bar 11 constitutes at the same time the member for the radial movements and is connected by means of a chain 14 running through the hollow shaft 6 and over the pulley 15 to the stud 16 on the arm 17 and by means of a double spring 12 bent into an arc-shape and connected to a stud 13 fixed on the disc 10. This form differs however from the first form in the fact that, notwithstanding the double number of sectors and concentric circles of the target at the butts and the indicating or facsimile target in proximity of the marksman, the number of hammer bars and therefore also the number of the connecting cables between the butts and the shooting stand is not perceptibly increased as compared to that in the first form owing to particular electrical connections in combination with a checking device of the hammer bars.

As there are ten concentrical circles 1 to 10 in the target at the butts, said circles being separated from each other by small spaces, there are also provided in certain sectors ten recoiling balls and ten troughs, but only one of two sectors, that is four of eight sectors are thus equipped. In the indicator there are six hammer bars in the group for marking the points, that is, one bar for each odd numbered circle 1, 3, 5, 7, 9 and one more bar for the bull's eye circle 10, while in the groups for marking the sectors there are four hammer bars, that is one for each even sector of the target, the first sector requiring no circular movement as the starting position of the pointer is already within this sector though outside of the circles. In order to mark all eight sectors this pointer will therefore require but seven distinct circular movements, while in order to mark the ten circles it will have to perform ten definite circular movements because when starting it is located outside of the first circle.

The device for checking the falling of the hammer bars is contained in a chamber located within the upper part of the frame 3 and comprises the balls 55 placed between the upper plate 56 of the frame 3 and a bottom plate 57 and within the slots 58 of the bars 23. Sideways this chamber is limited by the plates guiding the outer edges of the bars and the balls which are of the same number as the bars less one, fill the whole width of the chamber less the thickness of one bar so that when one bar falls the balls will completely fill the whole width of the chamber and will prevent the other bars from falling further than the length of their slots will permit. But the length of these slots is such that each hammer bar in the structure, when the balls prevent their falling, cannot drop farther than its full stroke less half the distance between two steps of the stops 29, which in the case of the sectors of the target correspond to a circular movement extending half-way between the positions of two even sectors, and in the case of the circles of the target with a stop half way between the positions of two odd circles. If therefore two hammer bars of the same group fall simultaneously only one of the two bars will reach the regular stop, which owing to its slot being of shorter length will first have pushed the balls and will thus have barred the path for the further drop of the other bar, which will fall only until half way between two steps of the stops. In order to mark the intermediate sectors and circles between those represented by each hammer bar, two bars of two neighboring sectors and circles always have to be dropped and the length of their slots is such that the slot in the second bar is always longer than the slot in the first bar, because it is this second bar which determines and limits the extent of the path of the pointer and because of the greater length of the slot in said bar must correspond with a half way drop of said bar between the stops of the two respective bars. Thus in Figures 15 to 32 the positions of the bars are represented diagrammatically for all the positions of the pointer from circle 1 to 10 and from sector I, where no moving of this group of bars is needed to sector VIII.

With regard to the electrical connections the diagram in Fig. 13 explains the working of the balance levers with double contact in the target at the butts.

This diagram is similar to the one given for the first form of the invention except that the contacts of the intermediate sectors and circles have been added.

With regard to sector VI as shown in Fig. 13, $a$ and $b$ represent the terminals of the circle 3 between which the corresponding balance lever makes contact in order to mark a hit in this circle. Regarding the next circle 2 for which there is no communicating cable with the indicator the terminal 51' is connected to the terminal 1 and the terminal 2 to the lever 45 itself. The terminal $51^2$ is connected to the other terminals 1, 3, 4, 5, 6, 7, 8, 9 of this sector. If a bullet strikes near sector VI on circle 2 the balance lever 45 will cause a contact with 50 at the two contacts 51' and $51^2$ and will close the circuit of the electro-magnets 1 and 3 for the circles and the circuit of the electro-magnet VI for the sector and then the positions of the hammer bars will be that of Figures 16 and 30, so as to have the pointer marking sector 6 and circle 2.

But if the bullet strikes on circle 2 between the sectors IV and VI in addition to the contacts and the electro-magnet already mentioned there will also be a contact made between the terminals 51' and $51^2$ connected to the terminals of sector IV and therefore the electro-magnet IV will also be energized. The pointer would therefore mark the circle 2 on the sector V and the positions of the hammer bars would be those given in the Figures 16 and 28.

The third form of the invention as shown in Figs. 34 to 36 is distinguished by the fact, that in the checking devices for the falling of the hammer bars pendulums have been employed instead of balls, that a pinion worked by a rack is substituted for the endless rope and pulleys for producing the circular movements of the marking member, that in the devices for returning the bar operated arms back into their starting positions counter weights are employed instead of springs, and that the circuit closer has been simplified. In this form of the invention means have been provided for preventing any loss of current occasioned by the magnetizing of the pawl armatures of the electro-magnets.

In this form the plate 27 supporting the pawls 26 represents the cover plate of a compartment of which 2 is the base plate, and inside of which compartment the two arms $17^2$ and $19^2$ made of flat bars provided at the corresponding ends with bent up ends 17' and 19', which are also offset to extend beneath the hammers in the same manner that the ends 17', 19' are offset and extend beneath the hammers in the other forms of the invention. At the other ends of the arms $17^2$, $19^2$ counter weights $17^3$, $19^3$ are pivoted on pins 18', and there are also two arms $33^2$ for bringing the arms $17^2$, $19^2$ back to their starting positions which are pivoted on a common pin 31', said arms being provided at their working ends with friction rollers $33^3$ and said pin 31' is provided at its one end with a hand lever 30'. Inside of this compartment are also enclosed the stops 29 and the electro-magnets 28 which are mounted on a plate $27^2$ attached to the under side of the plate 27 by means of studs 27' screwed on to the same. The hammer bars 23 project through slots in the plate 27 into the back part of said compartment (shown on the left in Fig. 34) and are guided on a standard $1^2$ within a plate 3' which supports the bearings of the hollow shaft 6 of the rotary marking member. On this hollow shaft is also provided a pinion 6' which engages a rack 9' moving within guide $9^2$ and connected by means of a rod $9^3$ to an arm $19^4$ attached on the bent up part of the arm $19^2$ operated by the hammer bars controlling the rotary movements of the marking member. The rope 14 which passes through the hollow shaft 6 and over the roller 15 and controls the radial movements of the marking member is attached by means of a rod 14' to an arm $17^4$ secured on the bent up part of the arm $17^2$. The plate 3' also supports a pedestal $3^2$ carrying a cross bar $3^3$ upon which pendulums 61 are suspended by means of pins 61' held in position by the cover plate $3^4$. These pendulums are each arranged between two hammer bars and check the falling of said bars by means of catches and bosses provided on their ends. If with reference to Fig. 34 two hammer bars 23 drop simultaneously the projecting edge $23^2$ of the right hand bar will first meet the boss $61^2$ of the pendulum 61 and owing to the beveled surface of $61^2$ the pendulum will be swung to the left and will thereby bring the catch $61^3$ of the pendulum into the path of the edge $23^3$ of the left hand bar, so as to stop the fall of said bar. This bar arrested in a certain position corresponding to half the height between two steps of the stop, will furnish the means in a similar manner to that of the balls 55 shown in second form of the indicator, for marking the intermediate portion of the target located between those two portions determined by the two falling bars.

On the front side of the pedestal 1² the pendulum plates 25 retaining the balls 24 within the notches 23' of the bars 23 are kept locked by means of the pawl armatures 26 which are pivoted on the upper side of the plate 27 and are each operated by two electro-magnets 28. In order to prevent any loss of current and the adhesive of said levers to any iron parts coming into contact with the same the ends of said levers 26 are provided with brass tips 26' and besides brass strips 27⁴, 27⁵ secured to the surface of the plate 27 prevent any contact of said levers with the magnet-cores and plate. Likewise brass posts 27³ separating said levers prevent any side contact of said levers.

The interruption of the circuit which is operated immediately after the fall of a hammer bar is obtained in this form by a spring 62' against which the bent up edges 17', 19' of the arms 17², 19² contact. In this form these arms after having pushed the bars 23 up into their normal positions of rest move out of direct contact with the same and bear against the resilient blades 61' secured on top of the angles 62 screwed on the stop plates 29, the circuit in this case being established leading from one group of electromagnets to the source of electric current, and from here to the frame 1, 2, and thence to the arms 17², 19², the other group of electromagnets, through the insulated screw 62² and to the angle 62 which is insulated from the plate 29 by means of an insulating plate 29'.

As soon as the falling hammer bars 23 meet the arms 17', 17² and 19', 19² the electrical contact between the spring 62' and said arms will be broken and the circuit be interrupted.

I claim as my invention:

1. A target apparatus comprising an object target with the face thereof divided into a plurality of sections, an indicator target having in the face thereof a corresponding plurality of sections, a revoluble indicator carrying a radially movable pointer associated with the indicator target, and means actuated by striking any section of the object target for moving the said revoluble indicator and pointer to mark the corresponding section in the indicator target.

2. A target apparatus comprising an object target, with the face thereof divided into a plurality of sections, an indicator target having in the face thereof a plurality of sections corresponding to the sections of the face of the object target, a revoluble indicator carrying a radially movable pointer, devices for actuating the said revoluble indicator and radially movable pointer, and means operated electrically by striking any section of the object target for closing predetermined circuits to the devices for actuating the revoluble indicator and radially movable pointer to cause the same to move to the position to indicate a corresponding section in the indicator target.

3. A target apparatus comprising an object target with the face thereof divided into a plurality of sections, an indicator target having in the face thereof a plurality of sections corresponding to the sections of the face of the object target, a revoluble indicator associated with the indicator target, a radially movable pointer carried by the revoluble indicator, electrically controlled devices for moving the said revoluble indicator to predetermined positions, electrically controlled devices for moving the said radially movable pointer to predetermined positions, and means actuated by striking any section of the object target for simultaneously closing electric circuits to predetermine devices for moving the said radially movable pointer and the revoluble indicator to the section of the indicator target corresponding to the section of the object target which was struck.

4. A target apparatus comprising an object target with the face thereof divided into a plurality of concentric rings and sectors, an indicator target having in the face thereof a plurality of concentric rings and sectors corresponding to the concentric rings and sectors of the object target, a revoluble indicator associated with the indicator target, a radially movable pointer carried by the revoluble indicator, a hammer member corresponding to each concentric ring of the indicator target, a hammer member corresponding to each sector of the indicator target, means for normally maintaining the said hammer members in an initial operative position, means for releasing the said hammer members, and means operated by striking any concentric ring of the object target in any particular sector thereof for simultaneously actuating the releasing devices for the hammer members corresponding to the concentric ring and sector of the indicator target and permitting these hammers to be released to move the said revoluble indicator and radially movable pointer to a position on the face of the indicator target corresponding to the ring and sector struck on the object target.

5. A target apparatus comprising an object target with the face thereof divided into a plurality of concentric rings and sectors, an indicator target having in the face thereof a plurality of concentric rings and sectors corresponding to the concentric rings and sectors of the object target, a revoluble indicator device carried by the indicator target, a radially movable pointer carried by the revoluble indicator, a device for turning the revoluble indicator, a device for moving the radially movable pointer, a hammer corresponding to each concentric ring of the indicator target, a hammer corresponding to each sector of the indicator target, means for normally maintaining the said hammers in an initial position, electro-magnetic devices for releasing the said means to permit the said hammers to fall to actuate the devices for moving the said revoluble indicator device and the radially movable pointer, and means operative by striking the object target in any concentric ring and sector thereof for simultaneously closing electric circuits to operate the said electro-magnetic devices for releasing the hammers corresponding to the ring and sector struck in the object target and means permitting the said hammers to drop predetermined distances to operate the said devices for moving the revoluble indicator device and radially movable pointer to carry the same sufficiently far to mark the ring and sector in the indicator target corresponding to the ring and sector struck in the object target.

6. A target apparatus comprising an object target with the face thereof divided into a plurality of concentric rings and sectors, an indicator target having in the face thereof a plurality of concentric rings and sectors corresponding to the concentric rings and sectors of the object target, a revoluble indicator device carried by the indicator target, a radially movable pointer carried by the revoluble indicator, a device for turning the revoluble indicator, a device for moving the radially movable pointer, a hammer corresponding to each concentric ring of the indicator target, a hammer corresponding to each sector of the indicator target, means for normally maintaining the said hammers in an initial position, electro-magnetic devices for releasing the said means to permit the said hammers to fall to actuate the devices for moving the said revoluble indicator device and the radially movable pointer, and a plurality of roller actuated circuit closing devices corresponding to the concentric rings and sector sections of the object target and operative when the object target is struck for simultaneously closing electric circuits to corresponding electro-magnetic devices for actuating the hammers of the sector and concentric ring of the indicator target corresponding to the sector and ring struck in the object target for releasing the said hammers and means permitting the same to drop predetermined distances and thereby actuate the said devices for moving the revoluble indicator device and radially movable pointer sufficiently far to mark the concentric ring and sector on the surface of the indicator target corresponding to the concentric ring and sector struck on the object target.

In testimony whereof I have affixed my signature is presence of two witnesses.

ARNOLD MICHOUD.

Witnesses:
EMLER SCHNEIDER,
W. MIEL.